(12) United States Patent
Maheshwari et al.

(10) Patent No.: US 10,764,300 B2
(45) Date of Patent: Sep. 1, 2020

(54) METHOD FOR EFFECTING AN AUTHENTICATION PROCEDURE ASSOCIATED WITH A SERVICE PROVIDER OR AN APPLICATION

(71) Applicant: MASTERCARD ASIA/PACIFIC PTE. LTD., Singapore (SG)

(72) Inventors: Rajat Maheshwari, Singapore (SG); Frederic Fortin, Brussels (BE); Vijin Venugopalan, Singapore (SG)

(73) Assignee: MASTERCARD ASIA/PACIFIC PTE. LTD., Singapore (SG)

(*) Notice: Subject to any disclaimer, the term of this patent is extended or adjusted under 35 U.S.C. 154(b) by 270 days.

(21) Appl. No.: 15/637,031

(22) Filed: Jun. 29, 2017

(65) Prior Publication Data
US 2018/0007062 A1  Jan. 4, 2018

(30) Foreign Application Priority Data

Jun. 29, 2016  (SG) .................. 10201605364X (51) Int. Cl.
*G06F 21/00*  (2013.01)
*H04L 29/06*  (2006.01)
(Continued)

(52) U.S. Cl.
CPC ........... *H04L 63/105* (2013.01); *G06F 21/32* (2013.01); *G06F 21/40* (2013.01); *H04L 63/08* (2013.01);
(Continued)

(58) Field of Classification Search
CPC .. H04L 63/105; H04L 63/08; H04L 2463/082; H04L 63/0861; G06F 21/32; G06F 21/40
See application file for complete search history.

(56) References Cited

U.S. PATENT DOCUMENTS 7,490,237 B1 * 2/2009 Morais .................. H04L 63/08
713/166
8,819,803 B1 * 8/2014 Richards ............... H04L 9/3213
726/9

(Continued)

FOREIGN PATENT DOCUMENTS

CN     105590045 A    5/2016
WO   2012166205 A1  12/2012

OTHER PUBLICATIONS

International Search Report from PCT Application No. PCT/SG2017/050315, dated Aug. 10, 2017.
(Continued)

*Primary Examiner* — Trong H Nguyen
*Assistant Examiner* — Amie C. Lin
(74) *Attorney, Agent, or Firm* — Budzyn IP Law, LLC (57) ABSTRACT

A computer device for effecting an authentication procedure associated with a service provider or an application, including a plurality of sensors; and one or more processors in communication with the sensors and non-transitory data storage including, stored thereon, a plurality of instructions which, when executed, cause the one or more processors to perform the steps of (a) receiving an authentication procedure request; (b) determining a hierarchy of authentication processes for the authentication procedure; (c) selecting an authentication process from the hierarchy of authentication processes; and (d) executing the authentication process.

18 Claims, 10 Drawing Sheets

(51) Int. Cl.
  *G06F 21/32*  (2013.01)
  *G06F 21/40*  (2013.01)
(52) U.S. Cl.
  CPC .... *H04L 63/0861* (2013.01); *H04L 2463/082* (2013.01)

(56) References Cited

U.S. PATENT DOCUMENTS

| | | | | |
|---|---|---|---|---|
| 2004/0257196 | A1* | 12/2004 | Kotzin | G07C 9/00142 340/5.52 |
| 2005/0238214 | A1 | 10/2005 | Matsuda et al. | |
| 2008/0051061 | A1* | 2/2008 | Takahashi | G06F 21/88 455/411 |
| 2008/0122577 | A1* | 5/2008 | Gutta | G07C 9/00158 340/5.52 |
| 2011/0225625 | A1 | 9/2011 | Wolfson et al. | |
| 2014/0123275 | A1* | 5/2014 | Azar | H04W 12/06 726/19 |
| 2014/0157401 | A1* | 6/2014 | Alameh | G06F 21/45 726/17 |
| 2014/0289116 | A1 | 9/2014 | Polivanyi | |
| 2015/0242840 | A1 | 8/2015 | Kursun | |
| 2015/0254467 | A1* | 9/2015 | Leuthardt | G06F 21/32 726/28 |
| 2015/0310444 | A1 | 10/2015 | Chen et al. | |
| 2016/0026786 | A1 | 1/2016 | Thomas | |
| 2016/0087952 | A1 | 3/2016 | Tartz et al. | |
| 2016/0294837 | A1* | 10/2016 | Turgeman | H04L 63/102 |

OTHER PUBLICATIONS

Extended European Search Report for European Application No. 17820668.6 dated Mar. 31, 2020.

* cited by examiner

METHOD FOR EFFECTING AN AUTHENTICATION PROCEDURE ASSOCIATED WITH A SERVICE PROVIDER OR AN APPLICATION

FIELD OF THE INVENTION

The present invention relates to a method for effecting an authentication procedure associated with a service provider or an application.

BACKGROUND OF INVENTION

User authentication is typically required when accessing services (such as digital wallets, websites, networks, applications, etc) and devices (such as smartphones, computers, etc.). Commonly deployed authentication methods include:
 (a) password authentication;
 (b) Iris authentication;
 (c) Facial authentication;
 (d) Voice authentication;
 (e) Fingerprint authentication;
 (f) Vein authentication; and
 (g) Predetermined gestures.

Each of the above-mentioned authentication means has its relative strengths and weaknesses for security, reliability and/or implementation. As such, difficulties often arise in deciding which is the most appropriate authentication means to use.

Biometric authentication methods are convenient since there is nothing to lose or to remember. However, in order for them to be highly secure, increased user effort is required to use such systems. For example, in order to successfully authenticate using an iris scan:
 (a) the user device needs to be held the right way, the right distance, and for the right time; and
 (b) the image needs to be taken with the right lighting, with the proper head pose and with the proper eye position.

As such, multiple authentication attempts may be required in order to successfully authenticate. This process can be generally inconvenient and can lead to user dissatisfaction. This is particularly the case where the user is moving and/or is not in a well lit area.

In many instances, users may be less concerned with security (e.g., accessing gaming stats or viewing photos), while in other instances security is more important (e.g., purchasing something online or accessing email), and in some instances security is critical (e.g., accessing a bank account or access control to house/car).

Currently, each of these scenarios often requires the user to authenticate using the same biometric methods, requiring undue user attention and effort, which can cause annoyance in scenarios where security is not that important (e.g., in the first instance), whereas in more important security critical scenarios (e.g., in the last instance) the same biometric method is not sufficient enough.

The above difficulties may cause the devices to perform in a sub-optimal manner causing further frustration and dissatisfaction to the user.

Authenticating the user with an appropriate and most convenient Consumer Device Card Holder Verification Method (CDCVM) will be key to mobile payments.

It is generally desirable to overcome or ameliorate one or more of the above described difficulties, or to at least provide a useful alternative.

SUMMARY OF INVENTION

In accordance with the invention there is provided a computer device for effecting an authentication procedure associated with a service provider or an application, including:
 a plurality of sensors; and
 one or more processors in communication with the sensors and non-transitory data storage including, stored thereon, a plurality of instructions which, when executed, cause the one or more processors to perform the steps of:
  (a) receiving an authentication procedure request;
  (b) determining a hierarchy of authentication processes for the authentication procedure;
  (c) selecting an authentication process from the hierarchy of authentication processes; and
  (d) executing the authentication process.

Preferably, the step of determining the hierarchy of authentication processes includes the step of determining a priority of each one of said authentication processes.

Preferably, the step of determining the hierarchy of authentication processes includes the step of determining a confidence level associated with the authentication procedure.

Preferably, the step of determining hierarchy of authentication processes includes the steps of:
 (a) determining a status of each one of said sensors; and
 (b) adjusting priority associated with each one of the authentication processes based on the status of the sensors.

Preferably, the step of adjusting the priority includes the step of incrementing or decrementing a counter associated with each authentication process.

In accordance with the invention, there is also provided a method for effecting an authentication procedure associated with a service provider or an application, including the steps of:
 (a) receiving an authentication procedure request;
 (b) determining a hierarchy of authentication processes for the authentication procedure;
 (c) selecting an authentication process from the hierarchy of authentication processes; and
 (d) executing the authentication process.

Preferably, the step of determining the hierarchy of authentication processes includes the step of determining a priority of each one of said authentication processes.

Preferably, the step of determining the hierarchy of authentication processes includes the step of determining a confidence level associated with the authentication procedure.

Preferably, the step of determining hierarchy of authentication processes includes the steps of:
 (a) determining a status of each one of said sensors; and
 (b) adjusting priority associated with each one of the authentication processes based on the status of the sensors.

Preferably, the step of adjusting the priority includes the step of incrementing or decrementing a counter associated with each authentication process.

Advantageously, the above-described method cause the computer device to perform authentication in an optimal manner.

Authenticating the user with an appropriate and most convenient Consumer Device Card Holder Verification Method (CDCVM) improves mobile payments.

BRIEF DESCRIPTION OF THE DRAWINGS

Preferred embodiments of the invention are hereafter described, by way of non-limiting example only, with reference to the accompanying drawings, in which:

FIG. 1b is a diagrammatic illustration of the device shown in FIG. 1a;

DETAILED DESCRIPTION OF PREFERRED EMBODIMENTS OF THE INVENTION

Figure 1A:
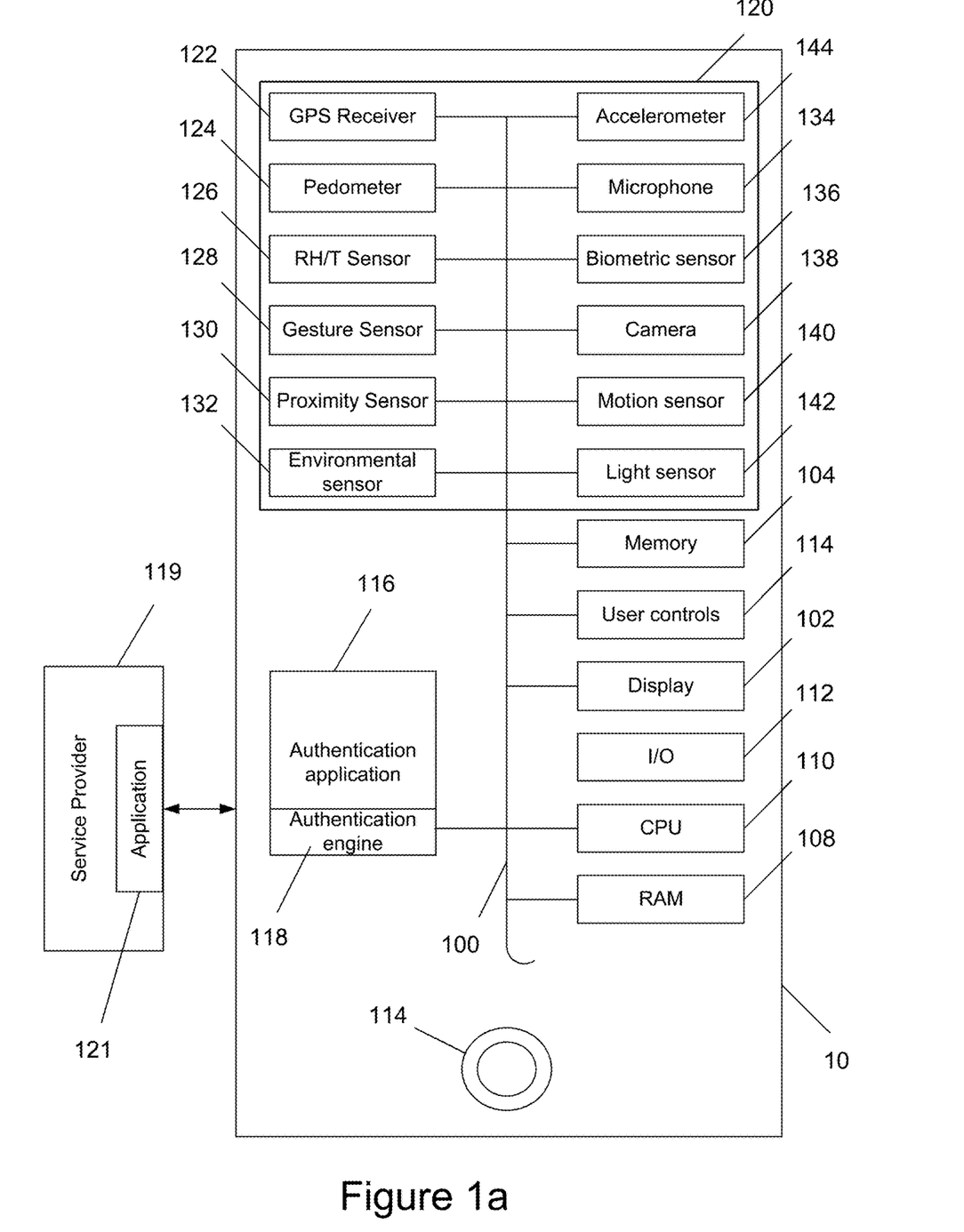
FIG. 1a is a schematic diagram of a device on which preferred embodiments of the invention are implemented.

FIG. 1a is a block diagram showing an exemplary device 10 in which embodiments of the invention may be practiced. The device 10 is preferably a mobile device that is any form of programmable computer device including but not limited to laptop computers, tablets, smartphones, televisions, desktop computers, home appliances, cellular telephones, personal television devices, personal data assistants (PDA's), palm-top computers, wireless electronic mail receivers, multimedia Internet enabled cellular telephones, wireless gaming controllers, receivers within vehicles (e.g., automobiles), interactive game devices, notebooks, smartbooks, netbooks, mobile television devices, or any computing device or data processing apparatus. For ease of description, the device 10 is below described, by way of non-limiting example, with reference to a mobile device in the form of a smart phone such as the one shown in FIG. 1b or one manufactured by LG™, HTC® and Samsung.

As shown, the device 10 includes the following components in electronic communication via a bus 100:

1. a display 102;
2. non-volatile (non-transitory) memory 104;
3. random access memory ("RAM") 108;
4. N processing components 110;
5. a transceiver component 112 that includes N transceivers; and
6. user controls 114.

Although the components depicted in FIG. 1a represent physical components, FIG. 1a is not intended to be a hardware diagram. Thus, many of the components depicted in FIG. 1a may be realized by common constructs or distributed among additional physical components. Moreover, it is certainly contemplated that other existing and yet-to-be developed physical components and architectures may be utilized to implement the functional components described with reference to FIG. 1a.

The display 102 generally operates to provide a presentation of content to a user, and may be realized by any of a variety of displays (e.g., CRT, LCD, HDMI, micro-projector and OLED displays). And in general, the non-volatile data storage 104 (also referred to as non-volatile memory) functions to store (e.g., persistently store) data and executable code including code that is associated with the functional components of an Authentication Application 116 that executes the processes 200 set out in FIG. 2 and an Authentication Priority Engine 118 configured in the manner shown in FIG. 3 to execute the processes 400 shown in FIG. 4.

In some embodiments for example, the non-volatile memory 104 includes bootloader code, modem software, operating system code, file system code, and code to facilitate the implementation of one or more portions of the Authentication Application 116 and the Engine 118 as well as other components well known to those of ordinary skill in the art that are not depicted nor described for simplicity.

In many implementations, the non-volatile memory 104 is realized by flash memory (e.g., NAND or ONENAND memory), but it is certainly contemplated that other memory types may be utilized as well. Although it may be possible to execute the code from the non-volatile memory 104, the executable code in the non-volatile memory 104 is typically loaded into RAM 108 and executed by one or more of the N processing components 110.

The N processing components 110 in connection with RAM 108 generally operate to execute the instructions stored in non-volatile memory 104. As one of ordinarily skill in the art will appreciate, the N processing components 110 may include a video processor, modem processor, DSP, graphics processing unit (GPU), and other processing components.

The transceiver component 112 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

It should be recognized that FIG. 1a is merely exemplary and in one or more exemplary embodiments, the functions described herein may be implemented in hardware, software, firmware, or any combination thereof. If implemented in software, the functions may be stored on or transmitted over as one or more instructions or code encoded on a non-transitory computer-readable medium 104. Non-transitory computer-readable media 104 includes both computer storage media and communication media including any medium that facilitates transfer of a computer program from one place to another. A storage media may be any available media that can be accessed by a computer.

The device 10 also includes one or more of the sensors 120 in electronic communication via a bus 100. In the example shown, the device 10 includes the following:

1. GPS Receiver 122;
2. Pedometer 124;
3. Relative humidity and temperature (RH/T) Sensor 126;
4. Gesture sensor 128;
5. Proximity sensor 130;
6. Environmental sensor 132;
7. Microphone 134;
8. Biometric sensor 136;
9. Camera 138;
10. Motion sensor 140;
11. Light sensor 142; and
12. accelerometer 144.

Figure 1B:
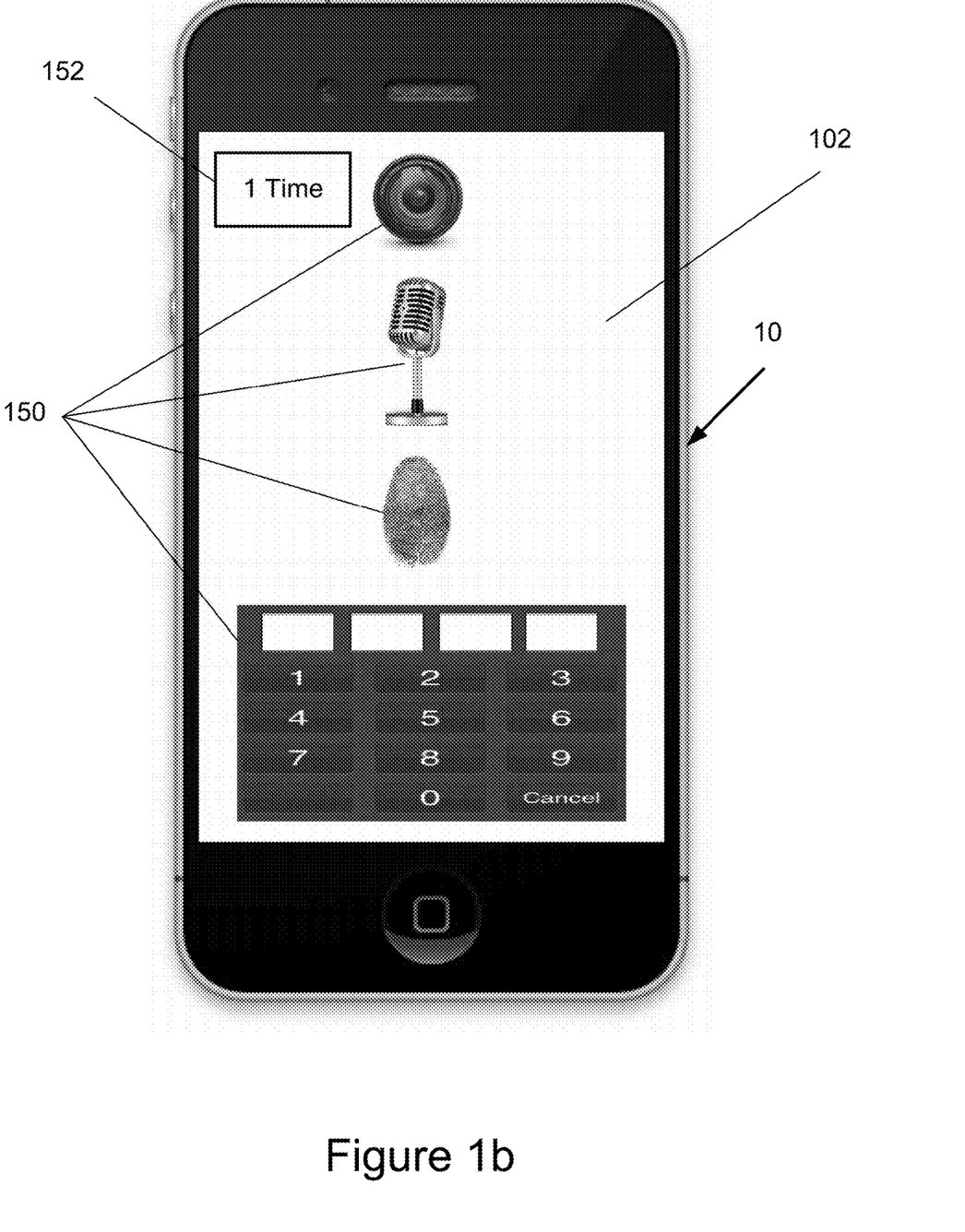

Although not shown in FIG. 1a, the device 10 may also include sensors 120 such as:
1. a clock;
2. a gyroscope;
3. magnetometer;
4. orientation sensor;
5. fingerprint sensor;
6. infrared sensor;
7. near field communication sensor;

An exemplary embodiment of the device 10 is shown in FIG. 1b. As shown, the device 10 includes a display 102 showing icons 150 for prioritised authentication and a window 152 indicating access type.

Authentication Application 116

Figure 2:
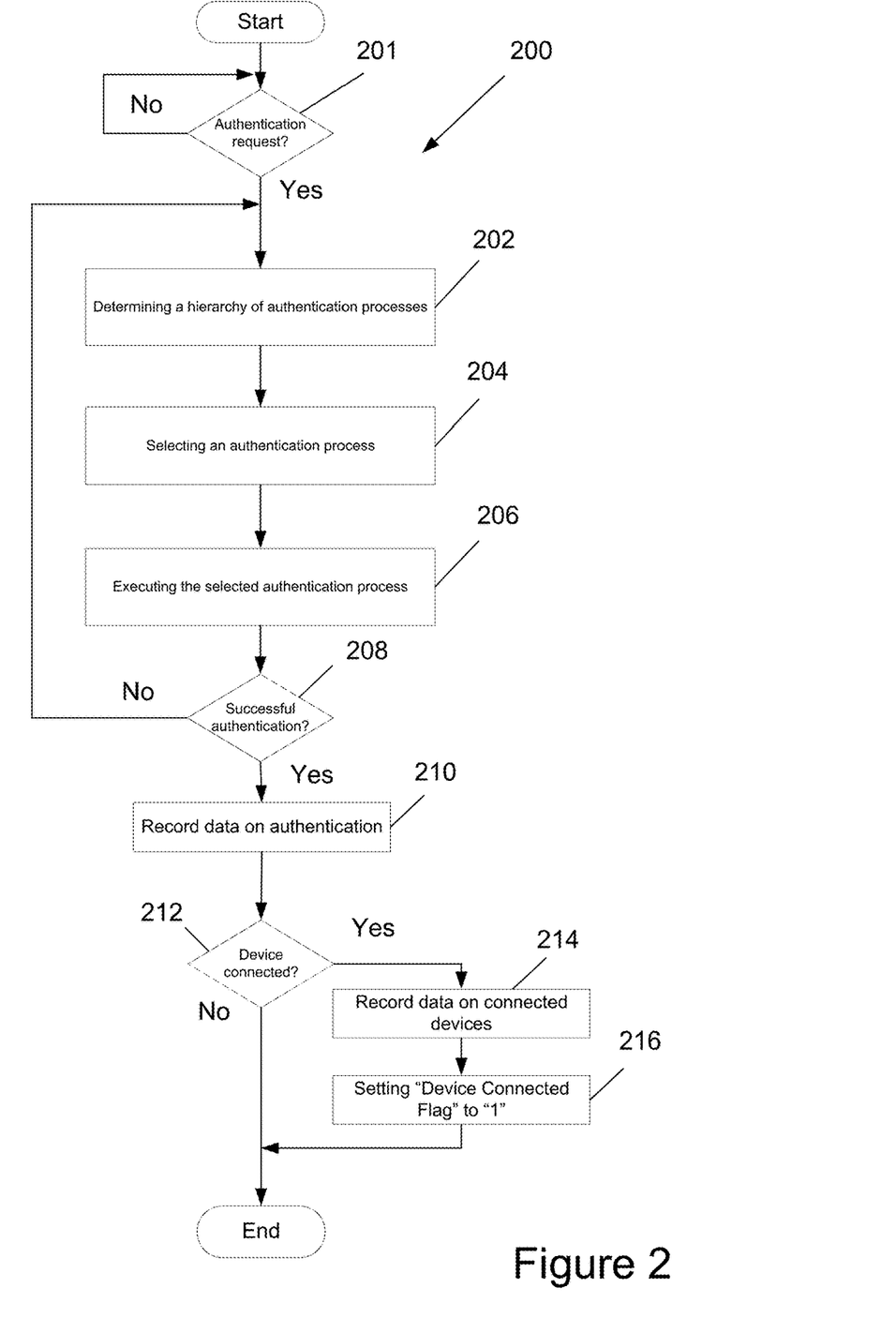
FIG. 2 is a flow diagram showing steps performed to prioritise and select an authentication process.

With reference to FIG. 2, the mobile device 10 executes the Authentication Application for an authentication procedure associated with a service provider or an application by performing the steps 200, including:
(a) receiving an authentication procedure request, at step 201;
(b) determining, at step 202, a hierarchy of authentication processes for the authentication procedure;
(c) selecting, at step 204, an authentication process from the hierarchy of authentication processes; and
(d) executing, at step 206, the authentication process.

As will be described below in further detail, the step, 202, of determining the hierarchy of authentication processes includes the steps of:
(a) determining a priority of each one of said authentication processes; and
(b) determining a confidence level associated with the authentication procedure.

If the authentication was successful, at step 208, then the process 200 includes the step 210 of recording data on the successful authentication.

Further, the process 200 includes a check, at step 212, to see if there are any separate devices connected to the mobile device 10. Such devices may include:
(a) a wearable device such as a watch or a wristband;
(b) a medical device such as a heartrate monitor;
(c) a virtual reality headset; and
(d) Internet of Things (JOT) device.

Alternatively, the other device may be any other device connected to the mobile device 10 at that time.

If connection to a separate device is detected, at step 212, then the following processing steps are performed:
(a) recording, at step 214 details of the separate device; and
(b) setting, at step 216, a "device connected" flag to "1", "TRUE" or another non-null value.

The device 10 includes the following authentication processes:
(a) Iris authentication;
(b) Facial authentication;
(c) Voice authentication;
(d) Fingerprint authentication;
(e) Vein authentication; and
(f) Heartbeat authentication.

Individually, each of the above authentications processes is known in the art and specific operations are not described here in further detail. Of course, it is envisaged that the invention can be used with any other suitable authentication process that can be used with the mobile device 10.

Each authentication process used by the mobile device 10 includes an associated Priority Number (also referred to as a priority counter). As described in further detail below, the priority number is used, in part, to rank the authentication process in the hierarchy.

The Confidence Level is measured as a number associated with the authentication procedure being effected. The Confidence Level is a number or a counter. For example, the Confidence Level may be a probability.

The Engine 118

Figure 3:
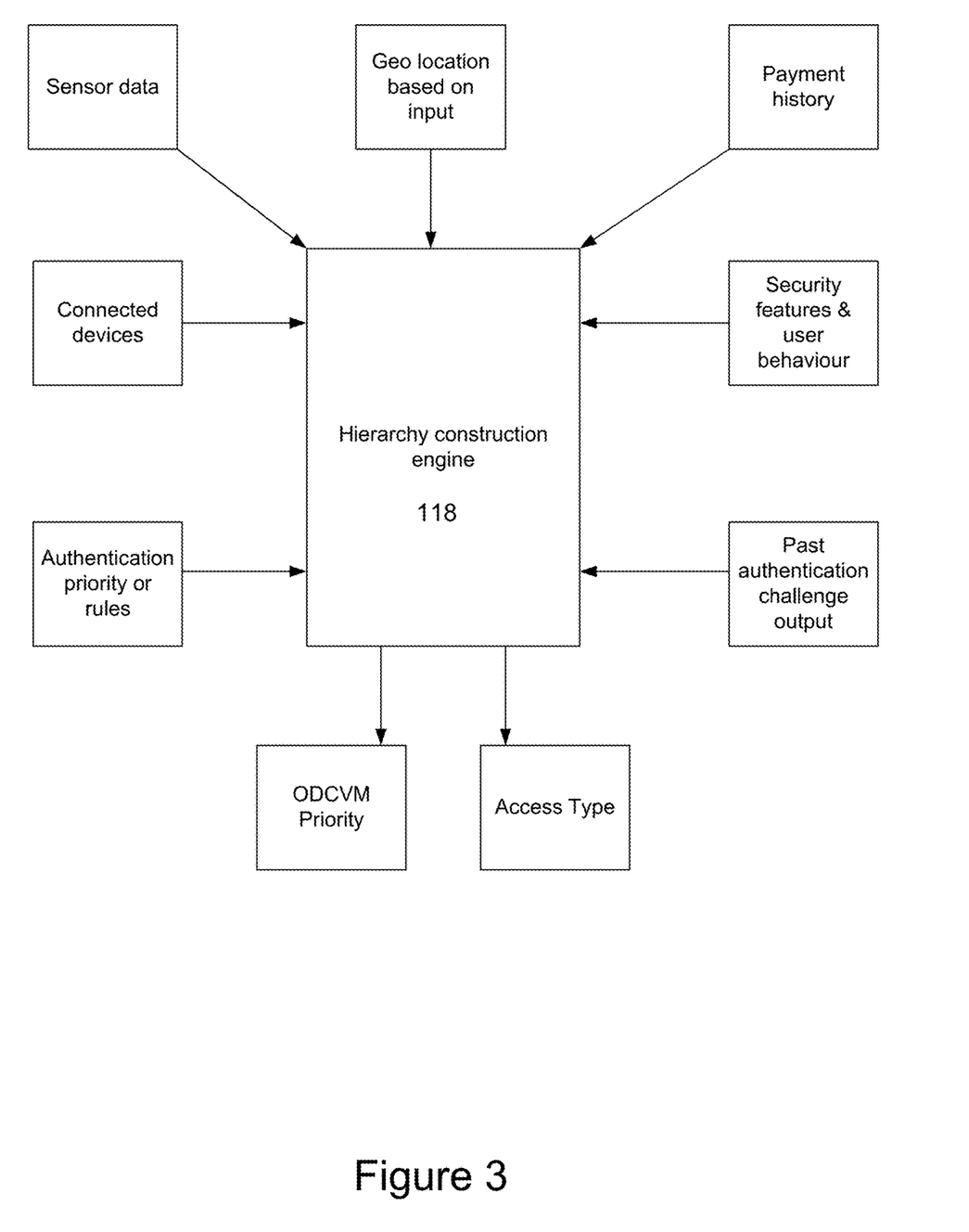
FIG. 3 is a schematic diagram showing inputs and outputs of an engine used to implement processing steps shown in FIG. 2.

As shown in FIG. 3, the Engine 118 is used to construct the hierarchy of authentication processes. This Engine 118 generates priority and confidence levels from one or more sources and returns:
(a) prioritised authentication processes;
(b) confidence level; and
(c) access type.

For example, as output, the Engine 118 provide data including:
(a) Priority list of customer device cardholder verification methods (CDCVM); and
(b) Type:
(i) One time (instant)
(ii) 'N' time (can be used for N transactions)
(iii) Continual (can be used until a particular condition fails, like user removing watch from his hand).

Figure 4:
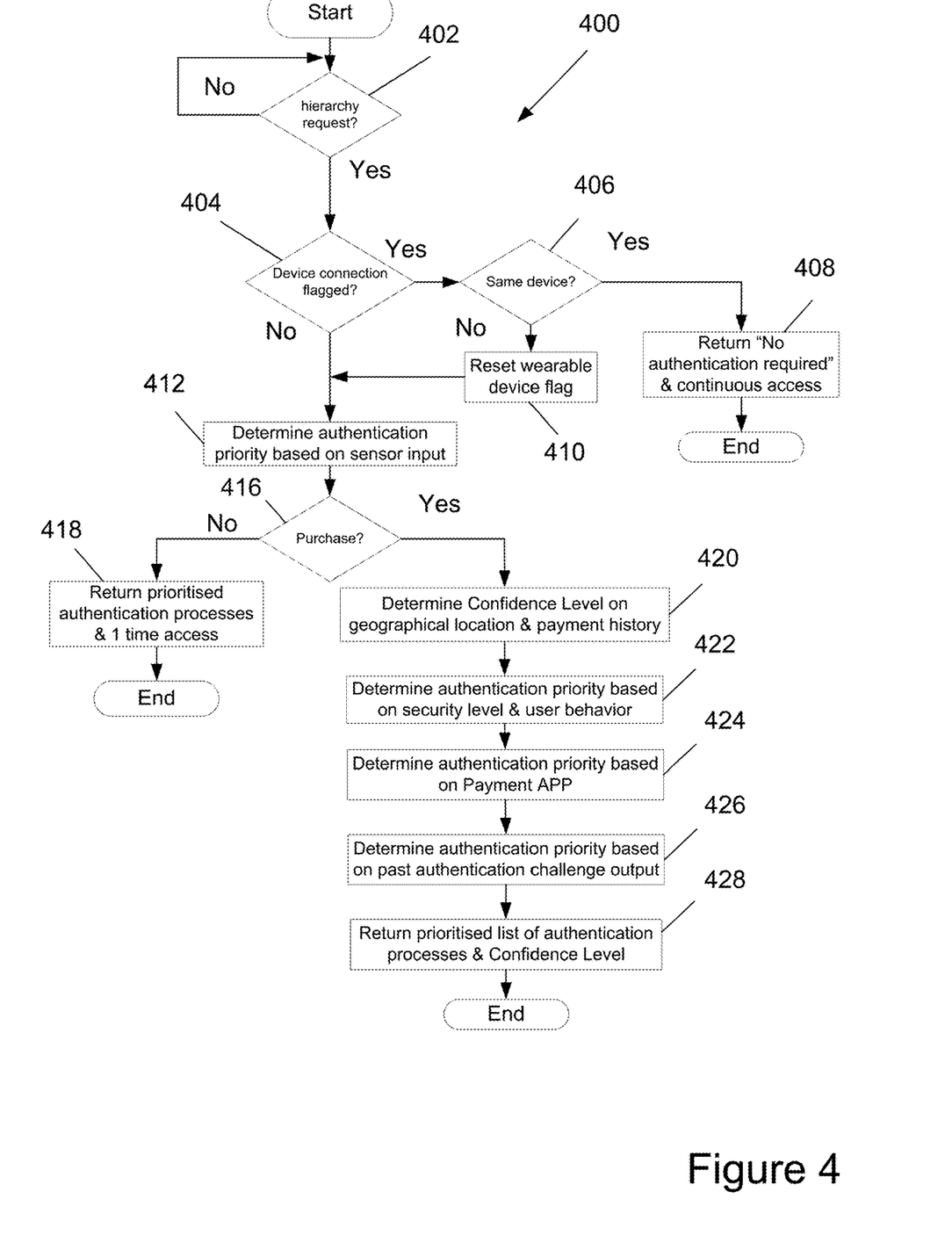
FIG. 4 is a flow diagram showing steps performed by the engine shown in FIG. 3.

The Engine 118 preferably performs the steps 400 shown in FIG. 4 to construct the prioritised hierarchy of authentication processes. These processes are described below in further detail.

Wearable Device Connected

The Engine 118 waits, at 402, for an authentication request. If an authentication request is received, at 402, then the Engine 118 checks, at 404, to see if the "device connected" flag has been set. As will be described in further detail below, this flag is set where:
(a) a separate device, such as a heartrate monitor, is connected to the mobile device 10, either wirelessly or by physical connection; and
(b) an authentication process has been successfully completed.

The separate device can be:
(a) a wearable device such as a watch or a wristband;
(b) a medical device such as a heartrate monitor;
(c) a virtual reality headset; and
(d) Internet of Things (TOT) device.

Alternatively, the other device may be any other device connected to the mobile device 10 at that time.

The additional devices can provide additional authentication ways and can help with Confidence Level and Access Type.

In the event that the flag has been set, then the Engine 118 checks, at 406, to see if the device currently connected to the mobile device 10 is the same as the one that set the flag. If so, then the Engine 118 allows the authentication process to be bypassed by returning, at step 408, a value of "No authentication required" and continuous access. For example:

If a user is wearing a watch or a wrist band connected to the device whilst performing an In-App purchase, then the user is authenticated continually until the user disconnects the device.

If a user is wearing a heartrate monitor connected to the device whilst performing an In-App purchase, then the user is authenticated continually until the user disconnects the device.

If the user is wearing virtual reality head gear whilst performing an In-App purchase, then the user is authenticated continually until the user disconnects the device.

BLE connection loss or lower RSSI strength can indicate the possible loss or misuse of the device.

Otherwise, if the device currently connected to the mobile device 10 is not the same as the one that set the flag, then the Engine 118 resets, at step 410, the "wearable device flag" to a zero or null value.

Authentication Priority Based on Sensor Input

Figure 5:
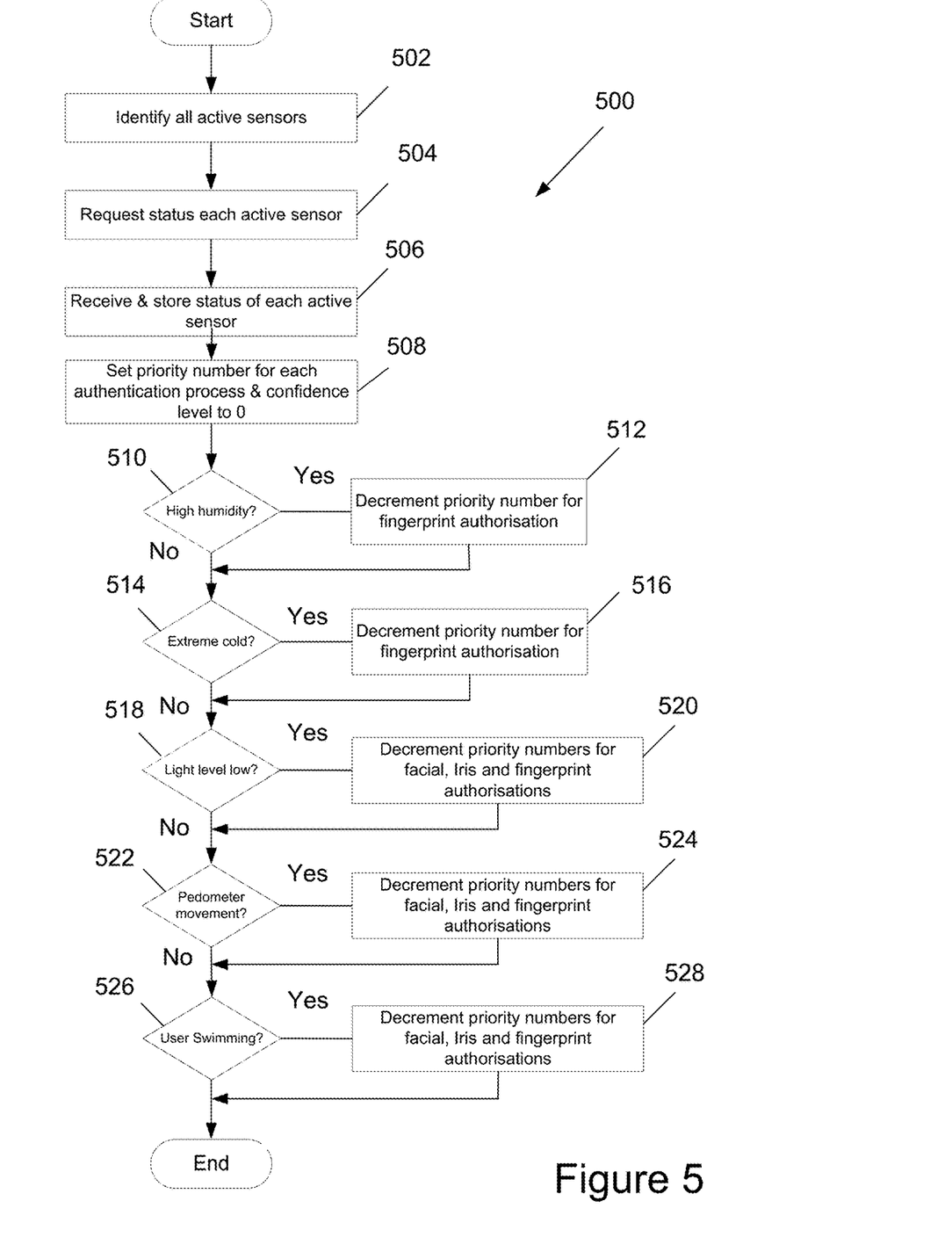
FIG. 5 is a flow diagram showing further steps performed by the engine shown in FIG. 3.

The Engine 118 then determines, at step 412, authentication priority numbers based on sensor information by performing the steps shown in FIG. 5.

The Engine 118 initially identifies, at step 502, all sensor devices 120 connected to or forming part of the mobile device 10. The Engine 118 then requests, at step 504, a status update from each sensor 120 and saves the response in memory 108.

The Engine 118 then configures the settings, at step 508, by performing the following steps:
 (a) the priority number of each authentication process is set to zero; and
 (b) the Confidence Level is set to zero.

The Engine 118 checks, at step 510, the humidity, as identified by the RT/H sensor 126 is "high". If the status of the RT/H sensor 126 is "high", then Engine decrements, at step 512, a priority number for fingerprint authentications.

The Engine 118 checks, at step 514, the temperature sensor 126. If the status of the RT/H sensor 126 is "cold", then Engine decrements, at step 516, a priority number for fingerprint authentications.

The Engine 118 checks, at step 518, the light sensor 142. If the status of the light sensor 142 is "low", then Engine decrements, at step 520, priority numbers for facial, iris and fingerprint authentications.

The Engine 118 checks, at step 522, the pedometer 124. If the status of the pedometer 124 is "moving", then Engine decrements, at step 524, priority numbers for facial, iris and fingerprint authentications.

The Engine 118 checks, at step 526, the gesture sensor 128. If the status of the gesture sensor 128 is "swimming", then Engine decrements, at step 528, priority numbers for facial, iris and fingerprint authentications.

Authentication not Associated with a Purchase

The Engine 118 determine, at 416, if the relevant authentication event is associated with a purchase. If it is not, then the Engine 118 returns, at step 418, the prioritised authentication processes and access type=one time access. The authentication request may be, for example, a request to unlock the mobile device 10.

Confidence Level Based on Geographical Location & Payment History

Figure 6:
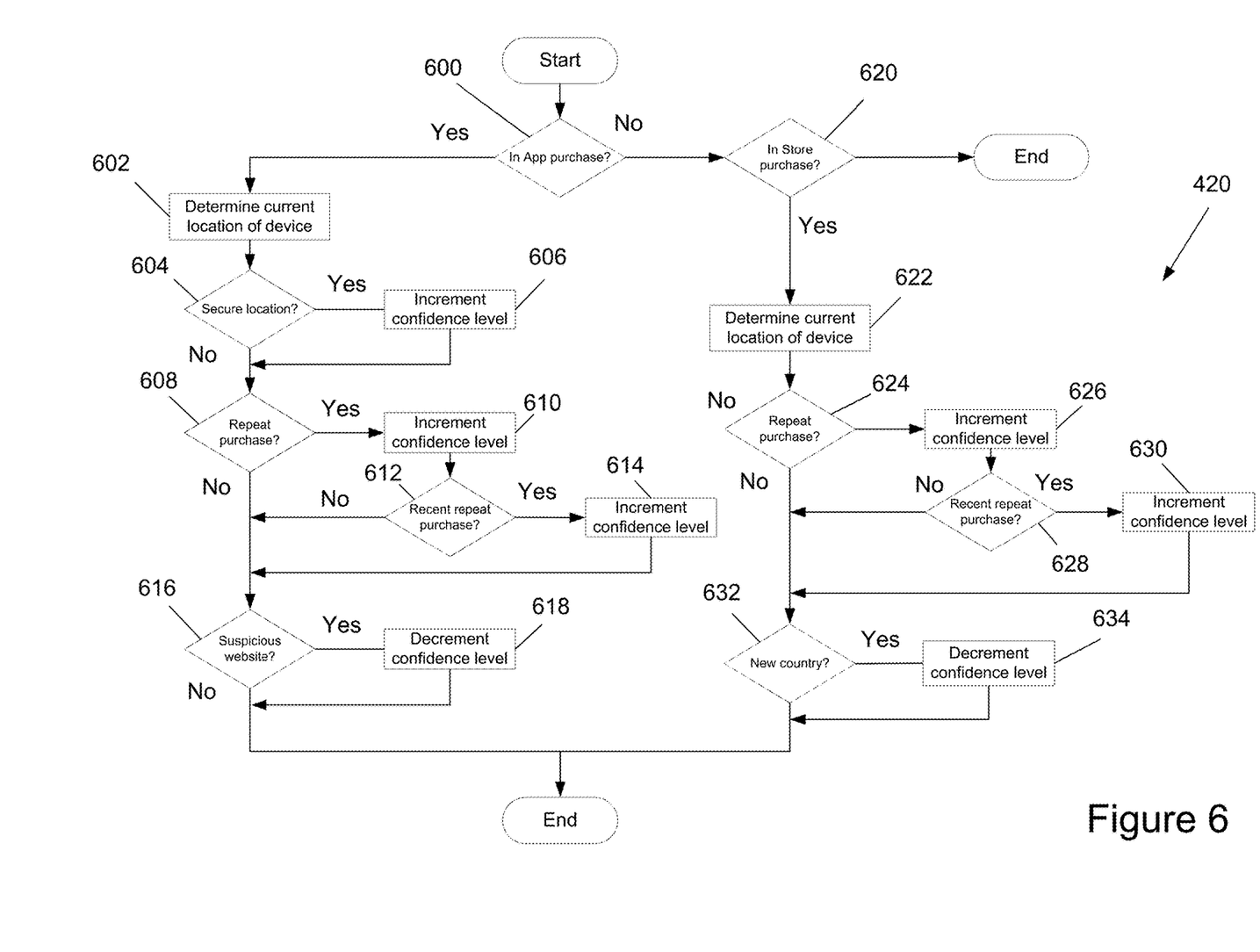
FIG. 6 is a flow diagram showing further steps performed by the engine shown in FIG. 3.

Otherwise, if the Engine 118 deems, at 416, that the authentication is associated with a purchase, then the Engine 118 executes the steps 420 shown in FIG. 6.

In-App Purchase?

If the Engine determine, at step 600, that the authentication is associated with an in-App purchase, then the Engine generates, at step 602, the current location of the device 10 and determines, 604, if the current location falls within a set of secure locations. If so, then the Engine increments, at step 606, the Confidence Level number.

Mobile device 10 has the capability to determine its current location using:
 (a) Global positioning system (GPS);
 (b) Global navigation satellite system (GNSS);
 (c) Baidu;
 (d) network aiding including sensor data;
 (e) Wifi connections; and
 (f) Bluetooth™ low energy wireless network (BLE).

A secure location can be, for example, user home location; user shipping address; and/or office address.

If the Engine 118 determines, at step 608, that the user has previously made a successful purchase with the same merchant, then the Engine 118 increments, at step 610, the Confidence Level number. Further, the Engine 118 checks, at 612, to determine if the repeat purchase was recently made. If so, then the Engine increments, at step 614, the Confidence Level number.

A set of successful purchases/authentications is developed over time by recording details of each successful transaction, including:
 (a) a location of merchant;
 (b) high or low value transaction;
 (c) name of merchant;
 (d) date of purchase; and
 (e) On Device Cardholder Verification Method (OD-CVM) used.

The Engine 118 checks, at step 616, to see if the site where the purchase is being made is suspicious. If found to be suspicious, then the Engine 118 decrements, at step 618, the Confidence Level number/counter.

In-Store Purchase?

If the Engine 118 determined, at step 600, that the purchase was not an in-App purchase, and the Engine 118 determines, at 620, that the purchase is an in-store purchase, then the Engine, at step 622, generates the current location of the device 10. If the Engine 118 determines, at step 624, that the user has previously made a successful purchase with the same merchant, then the Engine 118 increments, at step 626, the Confidence Level counter. Further, the Engine 118 checks, at 628, to determine if the repeat purchase was recently made. If so, then the Engine increments, at step 630, the Confidence Level counter.

As above-mentioned, a set of successful purchases/authentications is developed over time by recording details of each successful transaction, including:
 (a) a location of merchant;
 (b) high or low value transaction;
 (c) name of merchant;
 (d) date of purchase; and
 (e) On Device Cardholder Verification Method (OD-CVM) used.

The Engine 118 checks, at step 632, to see if the country where the purchase is being made is new. If so, then the Engine 118 decrements, at step 634, the Confidence Level counter.

Security Level & User Behaviour

Different configurations on the mobile device 10 exist (Device Identification), including:
 (a) Universal Integrated Circuit Card (UICC), Embedded Secure Element (ESE) or Host Card Emulation (HCE);
 (b) MPA security is APP level or Device level (depending on the architecture);
 (c) Authentications available on the device;
 (d) Last Device Unlock Status and the Authentication method used.

User behavior can also be tracked, such as:
 (a) Visiting suspicious websites;
 (b) Not following the normal behavior of access email/calls/messaging or other APP usage; and
 (c) Change in spending behavior.

Figure 7:
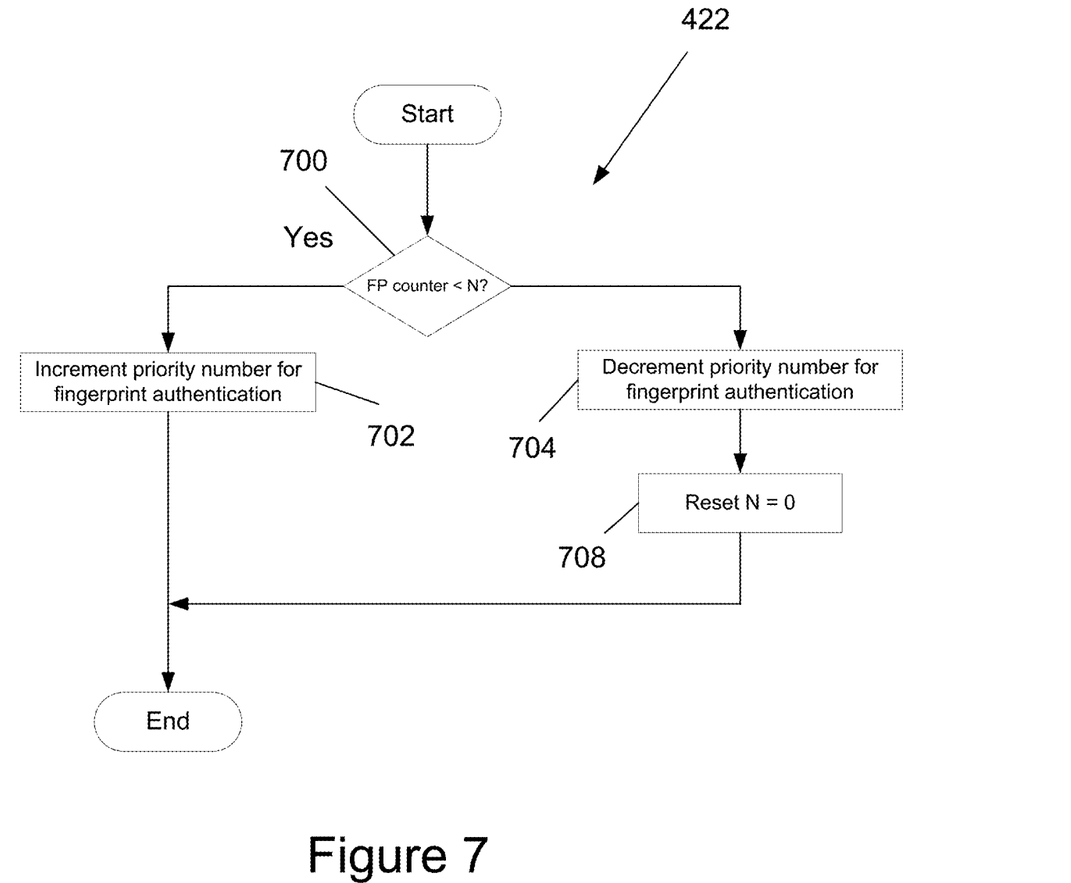
FIG. 7 is a flow diagram showing further steps performed by the engine shown in FIG. 3.

All such data can help in determining the ODCVM priority, confidence level and access type. For example, a fingerprint authentication can be used for authenticating "n" transactions without re-authenticating. As shown in FIG. 7, the Engine 118 performs the steps 422 to check, at step 700, if a Fingerprint Counter has exceeded a limit "N". The limit "N" is set preferably to 10 authentications. Alternatively, it can be set to any suitable number. If the Fingerprint Counter is less than N, then the Engine 118 increments, at step 702 the priority number for fingerprint authentication.

Alternatively, if too many fingerprint authentications have been used (i.e. Fingerprint Counter is greater than "N"), then the Engine 118 decrements the priority number for fingerprint authentication, at step 704, and resets, at step, 408, the Fingerprint Counter to zero.

Suspicious user behavior can void the continual or "n" time usage and immediately ask for authentication. Device Fingerprint, IRIS and Selfie not supporting Liveness detection—can help to determine if score should be lower.

Authentication Priority

Figure 8:
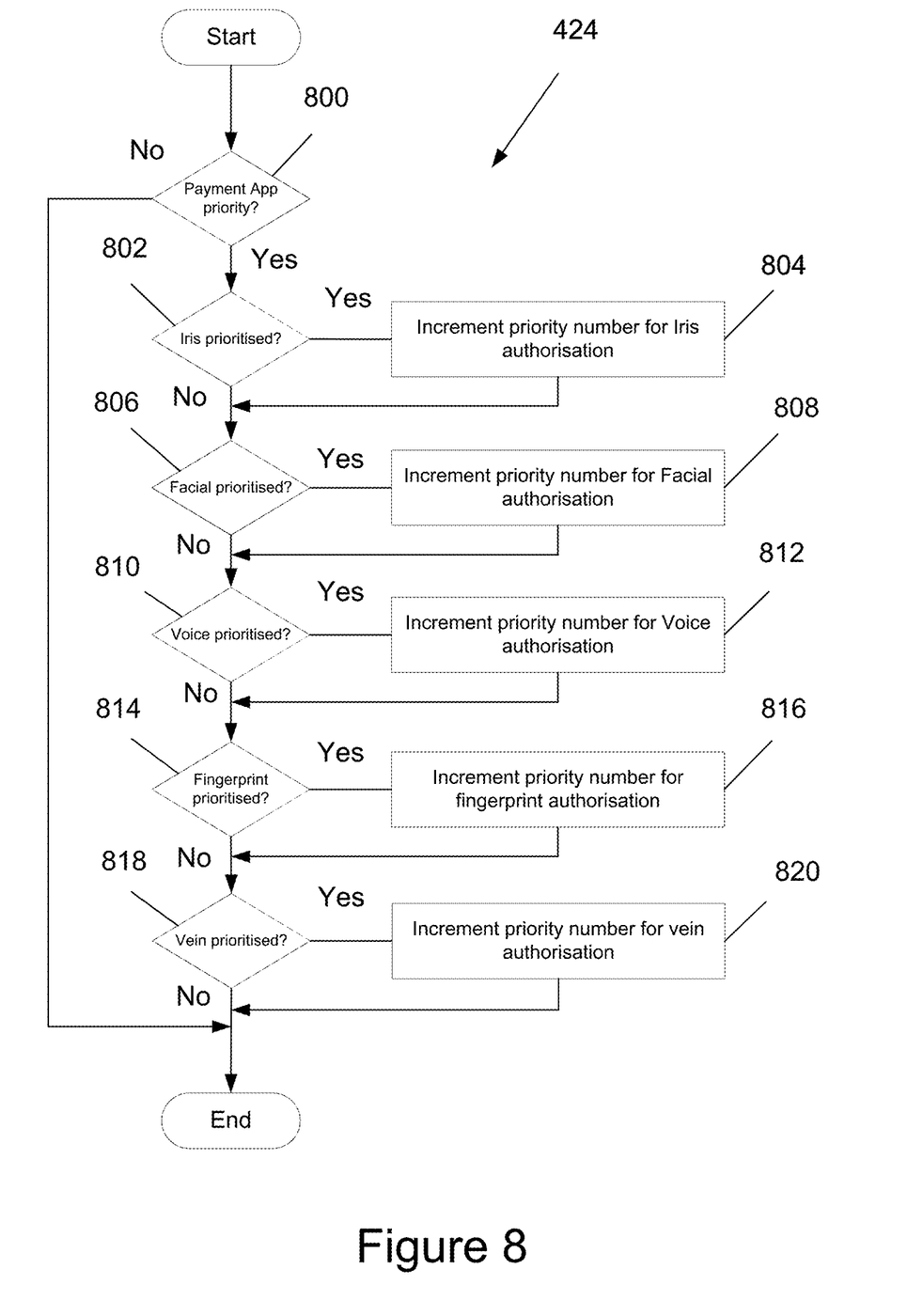
FIG. 8 is a flow diagram showing further steps performed by the engine shown in FIG. 3.

As shown in FIG. 8, the Engine 118 checks, at step 800, to see if priority is defined/requested by the Payment App. The rules can be fed into the Engine 118 dynamically to help in the outcome. For example a particular payment APP might prioritize IRIS over Fingerprint or one way over other. An example is set out below.

If priority has been defined/requested, at step 800, then the Engine 118 checks, at 802, to see:

- If Iris Authentication has been prioritized, at step 802. If so, then the Engine 118 increments, at step 804, the priority number for Iris authentication.
- If Facial Authentication has been prioritized, at step 806. If so, then the Engine 118 increments, at step 808, the priority number for Facial authentication.
- If Voice Authentication has been prioritized, at step 810. If so, then the Engine 118 increments, at step 812, the priority number for Voice authentication.
- If Fingerprint Authentication has been prioritized, at step 814. If so, then the Engine 118 increments, at step 816, the priority number for Fingerprint authentication.
- If Vein Authentication has been prioritized, at step 818. If so, then the Engine 118 increments, at step 820, the priority number for Vein authentication.

Past Authentication Challenge Output

The Engine 118 is able to use the benefit of past authentication challenges to influence the confidence level and thus the next authentication challenge. For example, while taking fingerprint, due to dirt or moisture, the prints are not clear. The matching score would be low or no sufficient matching points will be available. Possible output scenario:

(a) No-match Match;
(b) Detected with liveness;
(c) Match detected with no-liveness; and
(d) Indecisive due to limitation of environment or technology.

In case the outcome is indecisive (result (d)), the Engine 118 might request the fallback on other authentication challenge. Depending on the rules from Payment Application provider, similar authentication challenge or higher security authentication challenge can be requested to complete the transaction.

In case the outcome is a match detected but the device is not supporting liveness (result (c)), the Engine 118 might request fallback on other authentication challenge. Depending on the rules from Payment Application provider a lower security authentication challenge can be requested to complete the transaction.

Figure 9:
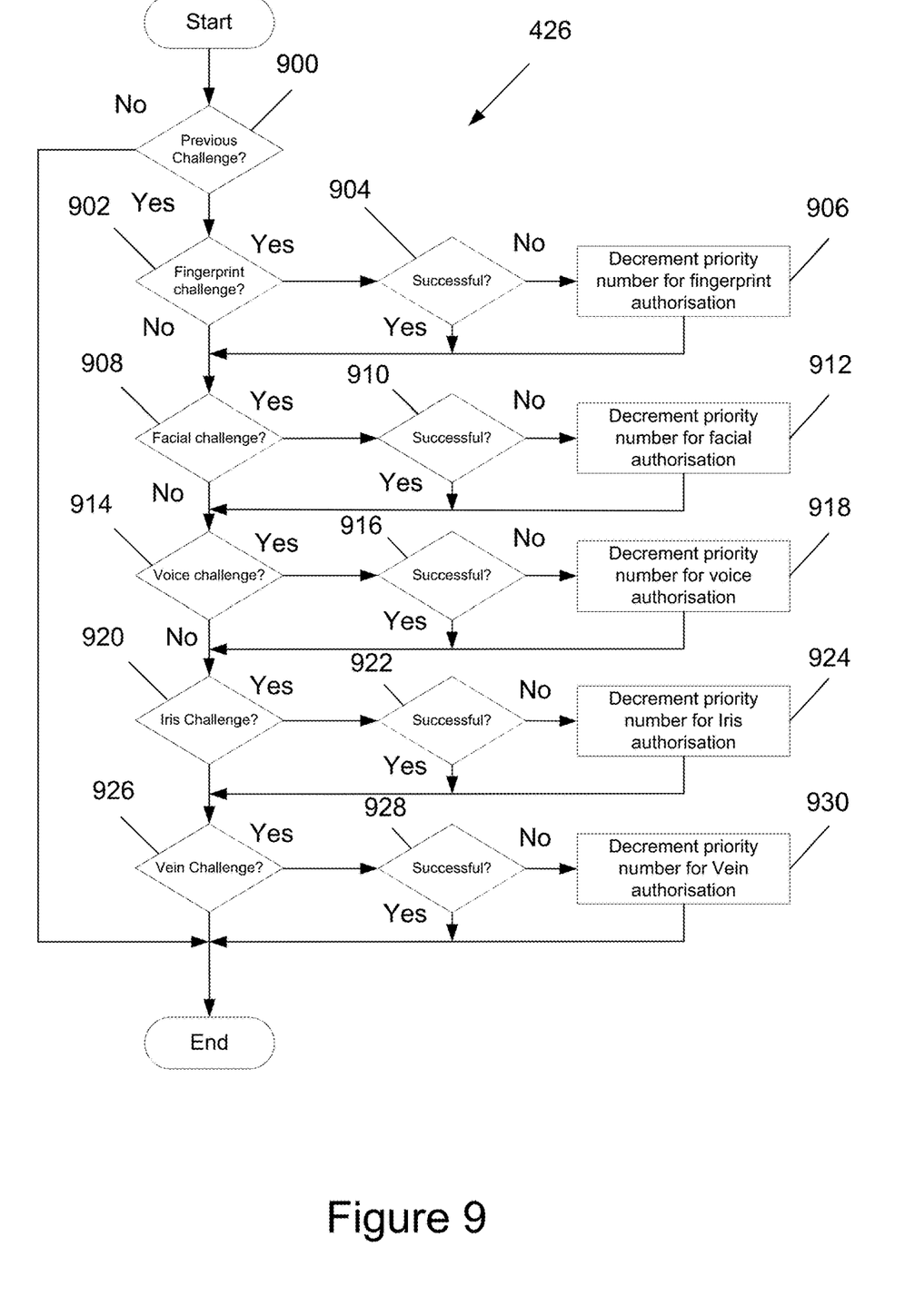
FIG. 9 is a flow diagram showing further steps performed by the engine shown in FIG. 3.

In view of the above, the Engine 118 executes the process 426 shown in FIG. 9 to influence the hierarchy of the authentication processes. The Engine 118 checks, at step 900, if a previous authentication challenge has been effected. If not, then the Engine returns to the process 400. Otherwise, the Engine runs through the following routine:

The Engine 118 checks, at step 902, to see if Fingerprint authentication had previously been used. If used, then the Engine checks, at step 904, to see if it was used successfully and, if so, then the Engine 118 decrements, at step 906, the priority number for fingerprint authentication.

The Engine 118 checks, at step 908, to see if Facial authentication had previously been used. If used, then the Engine checks, at step 910, to see if it was used successfully and, if so, then the Engine 118 decrements, at step 912, the priority number for Facial authentication.

The Engine 118 checks, at step 914, to see if Voice authentication had previously been used. If used, then the Engine checks, at step 916, to see if it was used successfully and, if so, then the Engine 118 decrements, at step 918, the priority number for Voice authentication.

The Engine 118 checks, at step 920, to see if Iris authentication had previously been used. If used, then the Engine checks, at step 922, to see if it was used successfully and, if so, then the Engine 118 decrements, at step 924, the priority number for Iris authentication.

The Engine 118 checks, at step 926, to see if Vein authentication had previously been used. If used, then the Engine checks, at step 928, to see if it was used successfully and, if so, then the Engine 118 decrements, at step 930, the priority number for Vein authentication.

The Engine 118 can help in choosing the most efficient and convenient way of authenticating the user on Mobile device 10. This can be used as a Card Holder Verification method.

The Engine 118 takes into considerations the data from different kind of sensors available on the device including environmental sensors, motion sensors, camera, microphone, proximity, light sensor etc. The Engine 118 takes into consideration the current status of the device what activity user is performing.

Many modifications will be apparent to those skilled in the art without departing from the scope of the present invention.

The reference to any prior art in this specification is not, and should not be taken as, an acknowledgment or any form of suggestion that the prior art forms part of the common general knowledge in Australia or any other jurisdiction.

In this specification and the claims that follow, unless stated otherwise, the word "comprise" and its variations, such as "comprises" and "comprising", imply the inclusion of a stated integer, step, or group of integers or steps, but not the exclusion of any other integer or step or group of integers or steps.

References in this specification to any prior publication, information derived from any said prior publication, or any known matter are not and should not be taken as an acknowledgement, admission or suggestion that said prior publication, or any information derived from this prior publication or known matter forms part of the common general knowledge in the field of endeavour to which the specification relates.

The invention claimed is:

1. A computer device for effecting an authentication procedure associated with a service provider or an application, including:

a plurality of sensors for evaluating environmental characteristics of the computer device, the environmental characteristics including one or more of ambient relative humidity, ambient temperature, ambient light, and motion of the computer device;
a plurality of biometric sensors, each configured for an authentication process so that, as a result, the plurality of biometric sensors is associated with a plurality of authentication processes, the plurality of biometric sensors being separate from the plurality of sensors, wherein, a first of the plurality of biometric sensors being configured for fingerprint authentication, and, a second of the plurality of biometric sensors being configured for facial recognition; and,
one or more processors in communication with the plurality of sensors, the plurality of biometric sensors, and non-transitory data storage including, stored thereon, a plurality of instructions which, when executed, cause the one or more processors to perform steps of:
responsive to receiving an authentication procedure request, associate each of the authentication processes with a priority score of zero;
responsive to receiving the authentication procedure request, conducting a reading by each of the plurality of sensors;
prioritizing the plurality of biometric sensors by adjusting the priority score for each of the plurality of biometric sensors based on the readings of the plurality of sensors, to generate a hierarchy of the authentication processes associated with the plurality of biometric sensors, wherein, the adjusted priority scores of the plurality of biometric sensors represent operability of the plurality of biometric sensors based on the readings of the plurality of sensors;
selecting one of the plurality of biometric sensors as a highest-priority biometric sensor based on a highest prioritized of the plurality of biometric sensors within the hierarchy; and
executing the authentication procedure using the highest-priority biometric sensor.

2. The device claimed in claim 1, wherein the step of prioritizing the plurality of biometric sensors includes determining a confidence level associated with the authentication procedure.

3. The device claimed in claim 1, wherein the step of prioritizing the plurality of biometric sensors includes incrementing or decrementing a counter associated with each of the plurality of biometric sensors.

4. The device claimed in claim 3, wherein responsive to an ambient relative humidity sensor detecting the ambient relative humidity above a predetermined amount, decrementing a priority associated with the first biometric sensor.

5. The device claimed in claim 3, wherein responsive to an ambient light sensor detecting the ambient light to be at a level below a predetermined amount, decrementing a priority associated with the first biometric sensor.

6. The device claimed in claim 3, wherein responsive to a motion sensor detecting motion of the computer device being above a predetermined level, decrementing a priority associated with the first biometric sensor.

7. The device claimed in claim 3, wherein responsive to an ambient temperature sensor detecting the ambient temperature being below a predetermined level, decrementing a priority associated with the first biometric sensor.

8. The device claimed in claim 3, wherein responsive to an ambient light sensor detecting the ambient light to be at a level below a predetermined amount, decrementing a priority associated with the second biometric sensor.

9. The device claimed in claim 3, wherein responsive to a motion sensor detecting motion of the computer device being above a predetermined level, decrementing a priority associated with the second biometric sensor.

10. A method, using a computer device, for effecting an authentication procedure associated with a service provider or an application, including steps of:
receiving an authentication procedure request;
responsive to receiving the authentication procedure request, conducting readings by a plurality of sensors for evaluating environmental characteristics of the computer device, the environmental characteristics including one or more of ambient relative humidity, ambient temperature, ambient light, and motion of the computer device;
responsive to receiving the authentication procedure request, prioritizing a plurality of biometric sensors by assigning a priority score, initially set to zero, for each of the plurality of biometric sensors based on the readings of the plurality of sensors, each of the plurality of biometric sensors being configured for an authentication process so that, as a result, the plurality of biometric sensors is associated with a plurality of authentication processes, the priority scores of the plurality of biometric sensors generating a hierarchy of the authentication processes associated with the plurality of biometric sensors, the plurality of biometric sensors being separate from the plurality of sensors, wherein, a first of the plurality of biometric sensors being configured for fingerprint authentication, and, a second of the plurality of biometric sensors being configured for facial recognition, and, wherein the priority scores of the plurality of biometric sensors represent operability of the plurality of biometric sensors based on the readings of the plurality of sensors;
selecting one of the plurality of biometric sensors as a highest-priority biometric sensor based on a highest prioritized of the plurality of biometric sensors within the hierarchy; and
executing the authentication procedure using the highest-priority biometric sensor.

11. The method claimed in claim 10, wherein the step of prioritizing the plurality of biometric sensors includes determining a confidence level associated with the authentication procedure.

12. The method claimed in claim 10, wherein the step of prioritizing the plurality of biometric sensors includes incrementing or decrementing a counter associated with each of the plurality of biometric sensors.

13. The method claimed in claim 12, wherein responsive to an ambient relative humidity sensor detecting the ambient relative humidity above a predetermined amount, decrementing a priority associated with the first biometric sensor.

14. The method claimed in claim 12, wherein responsive to an ambient light sensor detecting the ambient light to be at a level below a predetermined amount, decrementing a priority associated with the first biometric sensor.

15. The method claimed in claim 12, wherein responsive to a motion sensor detecting motion of the computer device being above a predetermined level, decrementing a priority associated with the first biometric sensor.

16. The method claimed in claim 12, wherein responsive to an ambient temperature sensor detecting the ambient temperature being below a predetermined level, decrementing a priority associated with the first biometric sensor.

17. The method claimed in claim 12, wherein responsive to an ambient light sensor detecting the ambient light to be at a level below a predetermined amount, decrementing a priority associated with the second biometric sensor.

18. The method claimed in claim 12, wherein responsive to a motion sensor detecting motion of the computer device being above a predetermined level, decrementing a priority associated with the second biometric sensor.

* * * * *